(12) United States Patent
Doi

(10) Patent No.: US 6,449,268 B1
(45) Date of Patent: Sep. 10, 2002

(54) DIGITAL RADIO COMMUNICATION SYSTEM, PDMA RADIO BASE STATION RECEPTION SYSTEM AND WEIGHT VECTOR CALCULATION METHOD

(75) Inventor: Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/175,974

(22) Filed: Oct. 21, 1998

(30) Foreign Application Priority Data

Oct. 22, 1997 (JP) .............................................. 9-289505

(51) Int. Cl.$^7$ .................................................. H04J 3/24
(52) U.S. Cl. ........................................ 370/349; 455/272
(58) Field of Search ................................... 370/328, 329, 370/330, 334, 345, 349; 375/144, 148, 149, 150, 152, 340, 341, 343, 346; 455/101, 272, 273, 277.1, 277.2, 278.1

(56) References Cited

U.S. PATENT DOCUMENTS

| | | | | |
|---|---|---|---|---|
| 5,548,834 A | * | 8/1996 | Suard et al. | 455/276.1 |
| 5,796,779 A | * | 8/1998 | Nussbaum et al. | 375/267 |
| 5,809,020 A | * | 9/1998 | Bruckert et al. | 370/335 |

* cited by examiner

*Primary Examiner*—Kwang Bin Yao
(74) *Attorney, Agent, or Firm*—Armstrong, Westerman & Hattori, LLP (57) ABSTRACT

When there is a request of extracting a user signal transmitted through a control channel, the weight vector thereof is calculated and stored in a memory. When there is an extraction request of a user signal transmitted through a conversation channel, the weight vector thereof is calculated using the stored weight vector as an initial value. Thus, the calculation time required for the weight vector to converge can be reduced.

10 Claims, 11 Drawing Sheets

DIGITAL RADIO COMMUNICATION SYSTEM, PDMA RADIO BASE STATION RECEPTION SYSTEM AND WEIGHT VECTOR CALCULATION METHOD

BACKGROUND OF THE INVENTION

1. Field of the Invention

The present invention relates to a digital radio communication system, a reception system for a PDMA radio base station, and a method of calculating a weight vector. More particularly, the present invention relates to a digital radio communication system of the PDMA (Path Division Multiple Access) system having the function to calculate a weight vector by which a reception signal is multiplied to separate a desired signal from the signal received at a base station from a mobile station, reception system thereof, and weight vector calculation method.

2. Description of the Background Art

In the field of mobile communication systems such as portable telephones that have become extremely popular recently, various transmission channel allocation methods have been proposed to effectively use the frequencies. Some thereof are actually in practice.

Figure 6A:
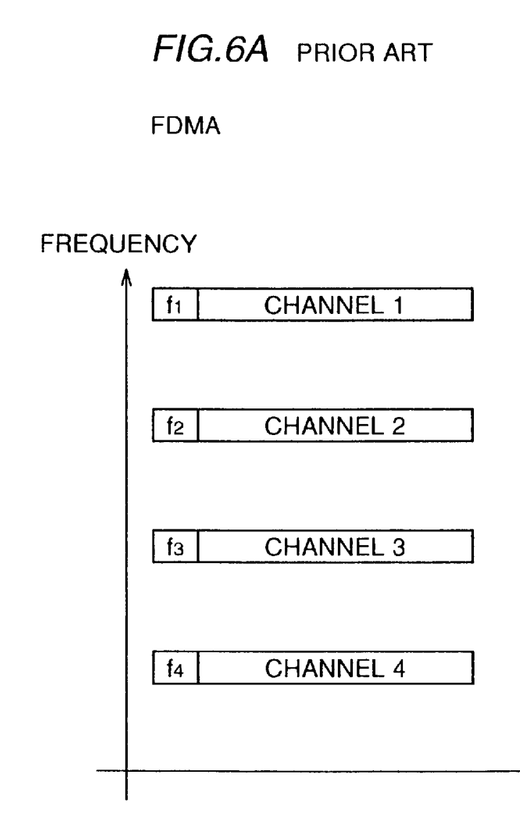
FIGS. 6A, 6B and 6C show the channel arrangements in communication systems of FDMA, TDMA, and PDMA, respectively.
Figure 6B:
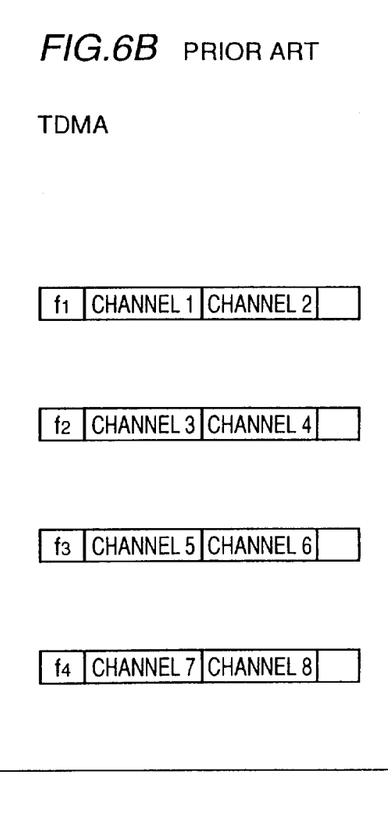
Figure 6C:
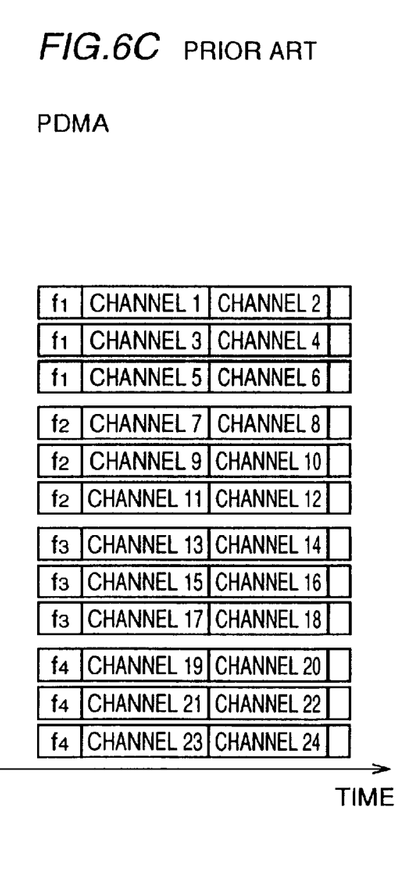

FIGS. 6A–6C show the channel arrangement in various communication systems of Frequency Division Multiple Access (FDMA), Time Division Multiple Access (TDMA), and PDMA. The systems of FDMA, TDMA, and PDMA will be described briefly with reference to FIGS. 6A–6C.

Referring to FIG. 6A corresponding to the FDMA system, the analog signals of users 1–4 are frequency-divided to be transmitted in radio waves of different frequencies f1–f4. The signals of respective users 1–4 are separated by frequency filters.

Referring to FIG. 6B corresponding to the TDMA system, the digitized signals of respective users are time-divided and transmitted in radio waves of different frequencies f1–f4 at every constant period of time (time slot). The signals of respective users 1–4 are separated by frequency filters and by time synchronization between a base station and each user's mobile terminal device.

Recently, the PDMA system has been proposed to improve the radio wave frequency usability to comply with the spread of portable telephones. In the PDMA system shown in FIG. 6C, one time slot of the same frequency is divided spatially to transmit data of a plurality of users. The signals of respective users 1–4 are separated using frequency filters, time synchronization between a base station and each user's mobile terminal device, and a mutual interference removal apparatus such as adaptive arrays.

Figure 7:
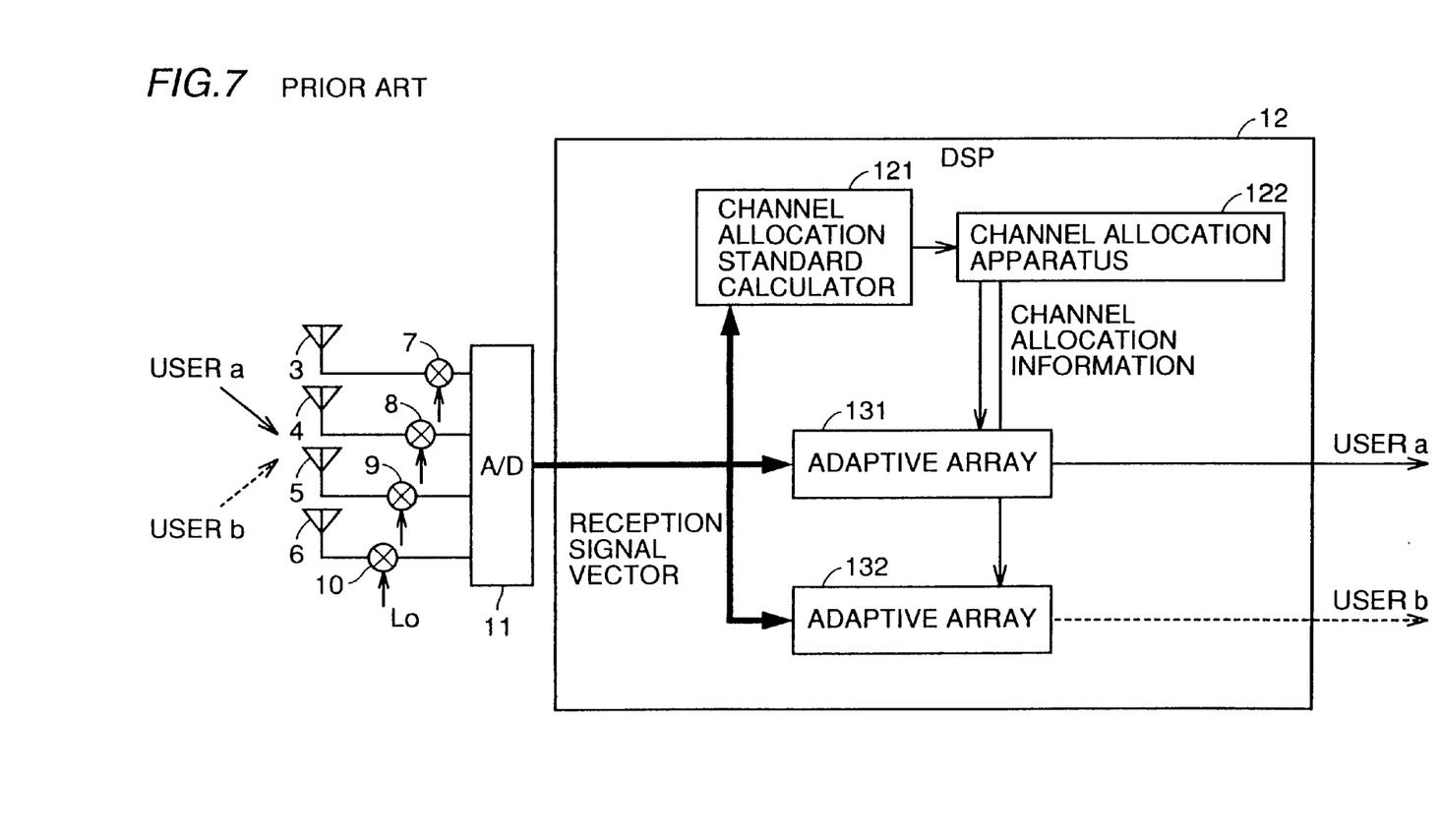
FIG. 7 is a block diagram showing a structure of a conventional reception system of a PDMA base station.

FIG. 7 shows the reception system of a conventional base station for use in PDMA. Four antennas 3–6 are provided to distinguish between user a and user b. The outputs of respective antennas are applied to frequency conversion circuits 7–10 to be frequency-converted by a local oscillation signal Lo and then applied to an A/D converter 11. The signals are converted into digital signals to be applied to a DSP (Digital Signal Processor) 12.

Figure 8:
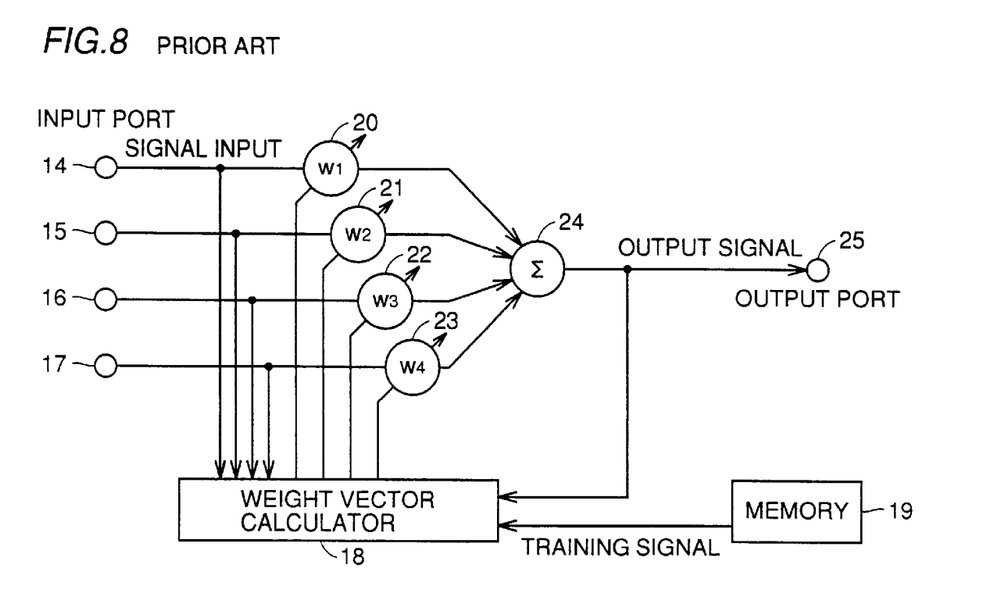
FIG. 8 is a logic diagram of a conventional adaptive array.

DSP 12 includes a channel allocation standard calculator 121, a channel allocation apparatus 122, and adaptive arrays 131 and 132. Channel allocation standard calculator 121 calculates data in advance to identify whether the signals of two users a and b can be separated by the adaptive arrays. In response to the calculation result, channel allocation apparatus 122 provides to each of adaptive arrays 131 and 132 the channel allocation information including user information that selects the frequency and the time. Each of adaptive arrays 131 and 132 is formed of, for example, a signal combine circuit as shown in FIG. 8. The signal of each user can be separated by selecting only the signal of a particular user.

FIG. 8 is a block diagram of a conventional adaptive array. In this example, in order to extract the signal of a certain user from input signals of a plurality of users, four input ports 14–17 are provided. The signals applied to input ports 14–17 are provided to a weight vector calculator 18 as well as to respective multipliers 20–23.

Weight vector calculator 18 uses the input signal as well as a training signal corresponding to the signal of a particular user prestored in a memory 19 or the output of an adder 24 that will be described afterwards to calculate weight vectors W1–W4. Multipliers 20–23 multiply the input signals of input ports 14–17 by weight vectors W1–W4, respectively. The multiplied results are sent to adder 24. Adder 24 adds the output signals of multipliers 20–23. The added result is output to an output port 25 and also to weight vector calculator 18 if necessary.

The weight vector will be described hereinafter.

Two signals $X_1(t)$ and $X_2(t)$ from a particular user are received at input ports 14 and 15 of the adaptive array of FIG. 8. Assuming that the adaptive array operates in an ideal manner, the output signal of the adaptive array is represented by the following equation.

$$Y(t) = W_1 X_1(t) + W_2 X_2(t) = S_1(t) + n(t)$$

Here, the weight vector W of that user is represented by the following equation.

$$W = \begin{bmatrix} W_1 \\ W_2 \end{bmatrix}$$

Figure 9:
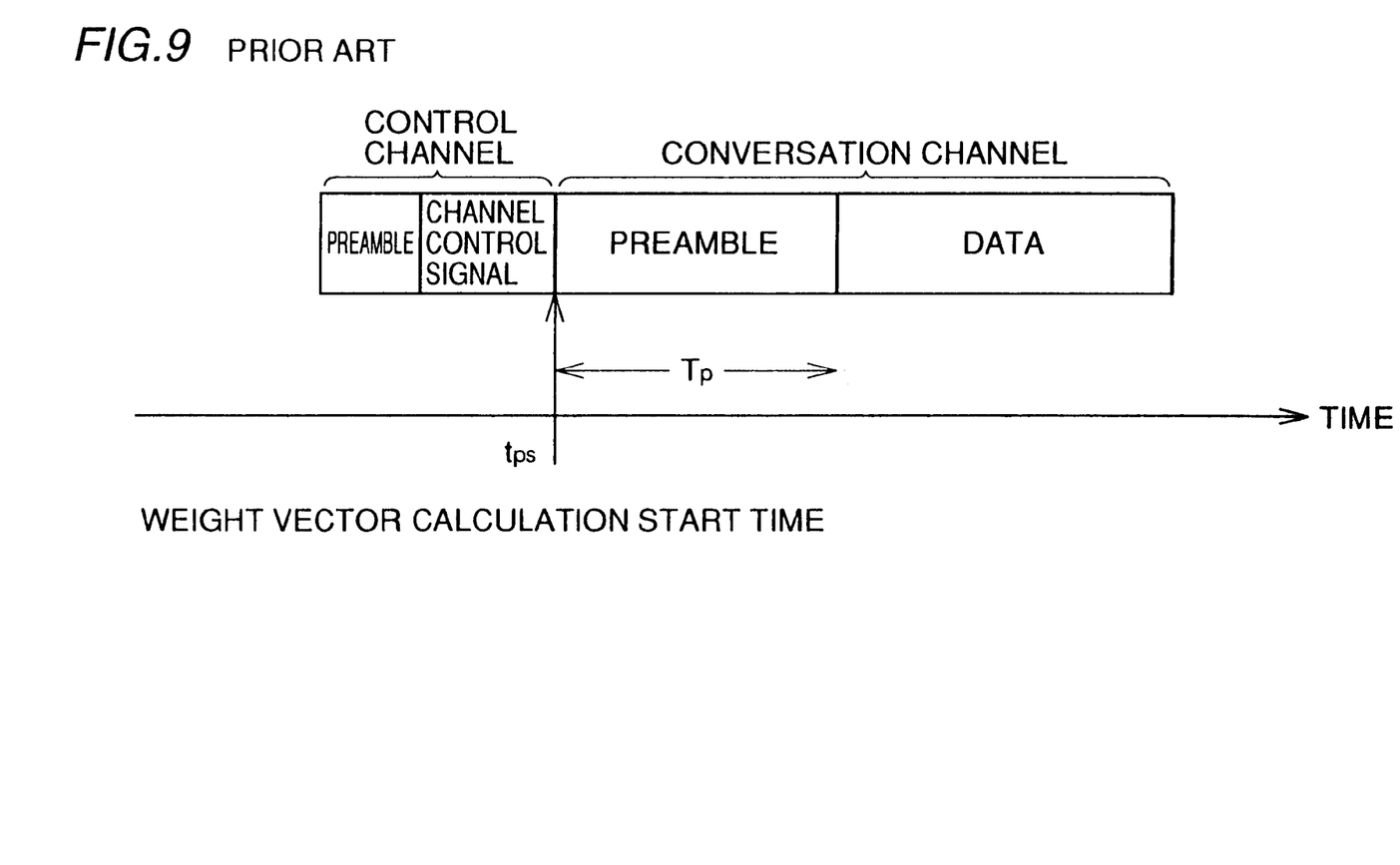
FIG. 9 shows the start time point of calculation of a weight vector according to a conventional weight vector calculation method.
Figure 10:
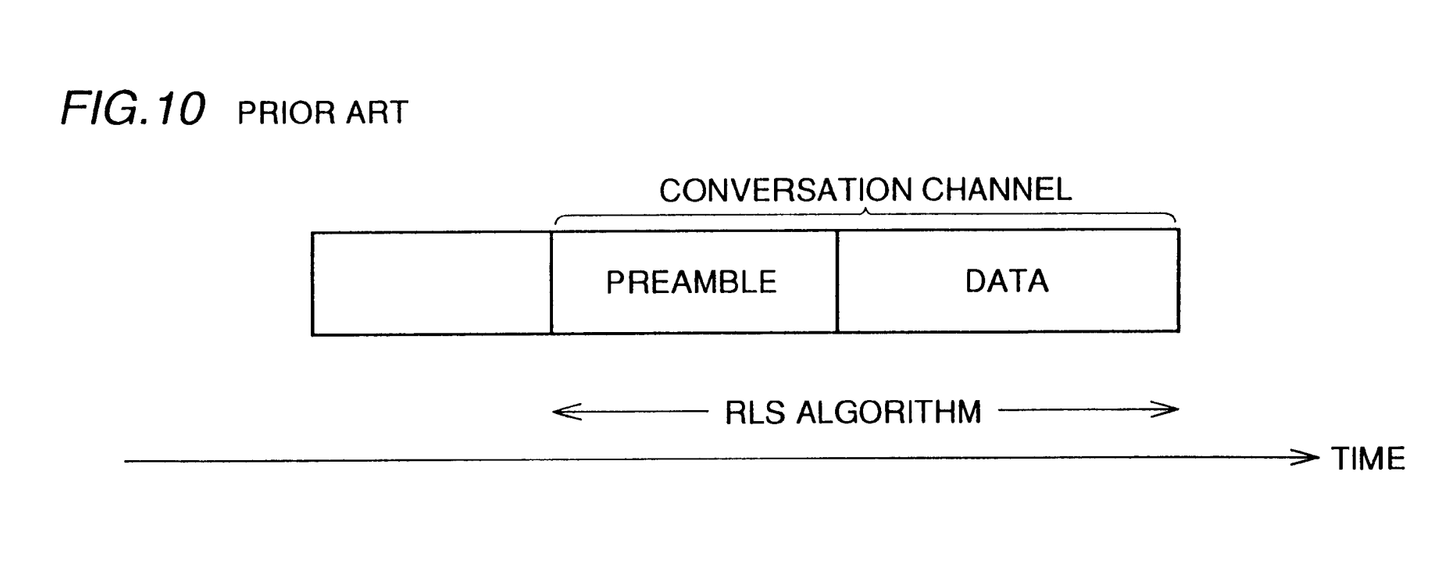
FIG. 10 is a timing chart for describing a conventional weight vector calculation method using the RLS algorithm.
Figure 11:
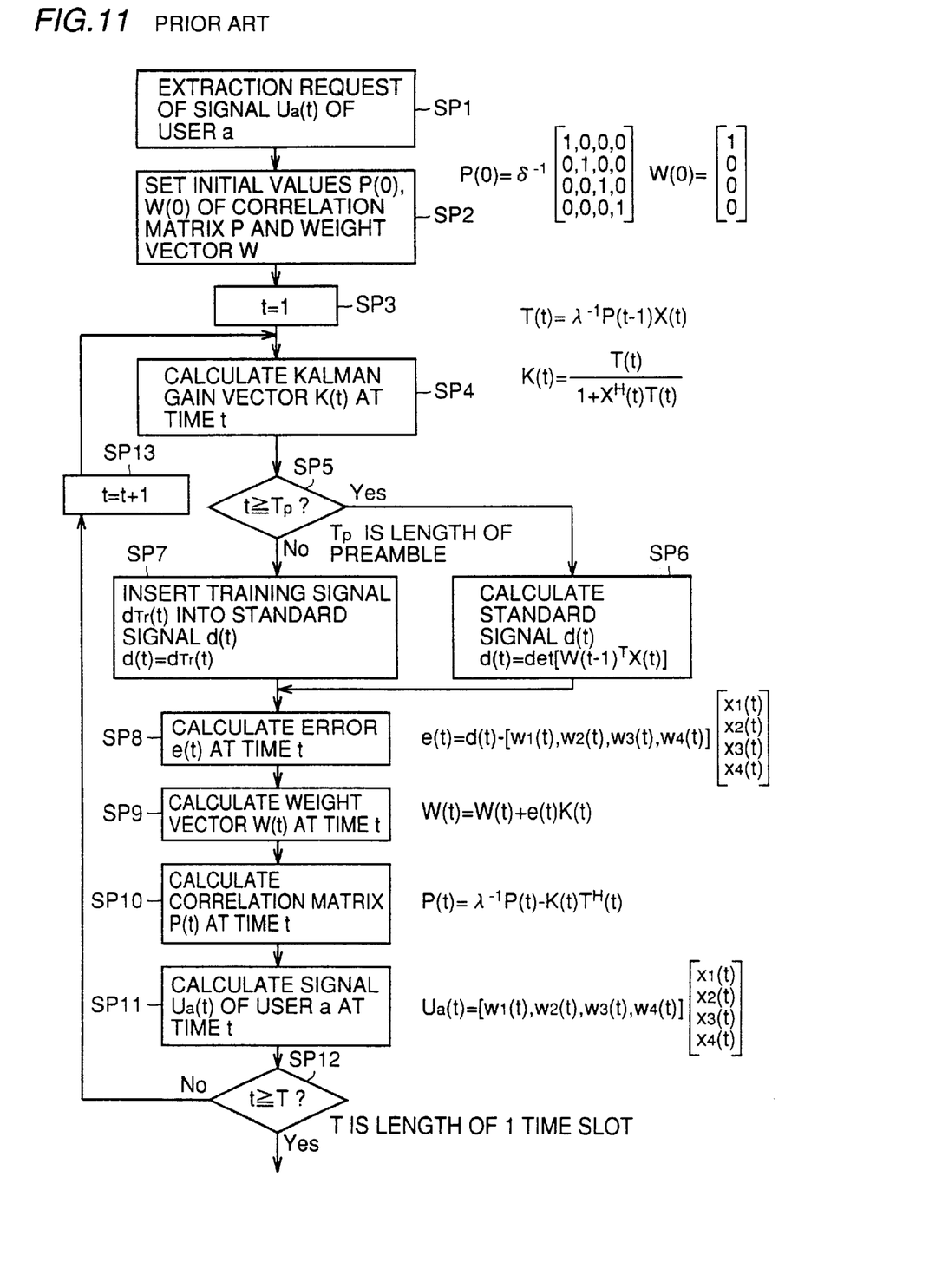
FIG. 11 is a flow chart showing the RLS algorithm of a conventional adaptive array.

FIGS. 9 and 10 schematically show the method of calculating a weight vector according to weight vector calculator 18 of the adaptive array of FIG. 8. FIG. 11 is a flow chart showing the procedure of signal extraction by the adaptive array of FIG. 8. As shown in FIG. 9, one time slot includes a preamble and a channel control signal transmitted through a control channel of a frequency $f_c$, and a preamble and-data transmitted through a conversation channel of a frequency $f_T$.

The weight vector of a user signal is calculated using the preamble and the data of the data signal transmitted via the conversation channel of FIG. 9.

The procedure of extracting a signal from a desired user using a weight vector will be described with reference to FIG. 11.

When extraction of a signal $U_a(t)$ of user a applied to, for example, input port 14 is requested at step SP1 of FIG. 11, weight vector calculator 18 of FIG. 8 sets the initial values P (0) and W (0) of a correlation matrix P and a weight vector W as in the following equation at step SP2.

$$P(0) = \delta^{-1} \begin{bmatrix} 1, 0, 0, 0 \\ 0, 1, 0, 0 \\ 0, 0, 1, 0 \\ 0, 0, 0, 1 \end{bmatrix}, \quad W(0) = \begin{bmatrix} 1 \\ 0 \\ 0 \\ 0 \end{bmatrix}$$

Here, $\delta$ is a positive decimal, for example $\delta = 1.0^{-10}$.

At step SP3, time t=1 is set. At step SP4, the Kalman gain vector K (t) at time t is calculated according to the following equation.

$$T(t) = \lambda^{-1} P(t-1) X(t)$$

$$K(t) = \frac{T(t)}{1 + X^H(t) T(t)}$$

In the above equations, T (t) indicates the intermediate generated vector at time t.

At step SP5, determination is made whether the time length $T_p$ of the preamble shown in FIG. 9 is smaller than t or not. When $t \geq T_p$, a standard signal d (t) is calculated according to the following equation at step SP6.

$$d(t) = \det[W(t-1)^T X(t)]$$

X (t) indicates the reception signal vector at time t.

When not $t \geq T_p$ at step SP5, control proceeds to step SP7 to substitute a training signal $d_{Tr}(t)$ for standard signal d (t). At step SP8, error e (t) of time t is calculated according to the following equation.

$$e(t) = d(t) - [W_1(t), W_2(t), W_3(t), W_4(t)] \begin{bmatrix} X_1(t) \\ X_2(t) \\ X_3(t) \\ X_4(t) \end{bmatrix}$$

At step SP9, weight vector W (t) at time t is calculated according to the following equation.

$$W(t) = W(t) + e(t) K(t)$$

At step SP10, correlation matrix P (t) at time t is calculated according to the following equation.

$$P(t) = \lambda^{-1} P(t) - K(t) T^H(t)$$

At step SP11, signal Ua (t) of user a at time t is calculated according to the following equation.

$$Ua(t) = [W_1(t), W_2(t), W_3(t), W_4(t)] \begin{bmatrix} X_1(t) \\ X_2(t) \\ X_3(t) \\ X_4(t) \end{bmatrix}$$

At step SP12, determination is made whether the time length T of one time slot is $t \geq T$. When $t \geq T$ is not established, control proceeds to step SP13 to increment t by +1. Then, control returns to step SP4.

In the conventional weight vector calculation method of FIG. 11, calculation of the weight vector must be converged within time period $T_p$ of the preamble of the data signal included in the conversation channel of FIG. 9. However, calculation of the weight vector will not converge within time period $T_p$ if time period $T_p$ of the preamble is short. As a result, the reception property is degraded.

Furthermore, in the conventional calculation method of a weight vector shown in FIG. 10, the weight vector of the received data signal was calculated using the same algorithm throughout one time slot. There is a disadvantage that the amount of calculation is great when a RLS (Recursive Least Square) algorithm, for example, is used. When the CMA (Constant Modulus Algorithm) is used, the convergence of the weight vector is time consuming. A long time is required until proper data is output, so that an error may occur in the data.

SUMMARY OF THE INVENTION

In view of the foregoing, an object of the present invention is to prevent degradation in the property of the reception signal in a digital radio communication system by reducing the time for convergence of the weight vector calculation.

Another object of the present invention is to improve the communication quality with an appropriate amount of calculation by appropriately switching the algorithm during weight vector calculation.

According to an aspect of the present invention, a radio communication system transmitting a control signal to initiate conversation through a control channel and transmitting a data signal for conversation through a subsequent conversation channel having a frequency differing from that of the control channel, includes a reception circuit with a plurality of antennas to receive a series of signals constituted by the control signal transmitted through the control channel and the data signal transmitted through the conversation channel from a user, a first calculation circuit for calculating a weight vector of the control signal received through the control channel, a memory for storing the calculated weight vector of the control signal, a second calculation circuit for calculating a weight vector of the data signal received through the conversation channel with the weight vector stored in the memory as an initial value, and a signal extraction circuit for extracting a data signal according to the calculated weight vector of the data signal.

According to another aspect of the present invention, a reception system of a PDMA radio base station receiving from each user a series of signals constituted by a control signal to initiate conversation transmitted through a control channel and a data signal for conversation transmitted through a subsequent conversation channel having a frequency differing from that of the control channel, includes a plurality of antennas receiving the series of signals from each user, and an adaptive array separating a series of signals of a desired user from the signals received on the antennas. The adaptive array includes a first calculation circuit for calculating a weight vector of the control signal received through the control channel, a memory for storing the calculated weight vector of the control signal, a second calculation circuit for calculating a weight vector of the data signal received through the conversation channel with the weight vector stored in the memory as an initial value, and a signal extraction circuit for extracting the data signal according to the calculated data signal weight vector.

According to a further aspect of the present invention, a weight vector calculation method in a radio communication system that transmits a control signal to initiate conversation through a control channel and that transmits a data signal for conversation through a subsequent conversation channel having a frequency differing from that of the control channel, includes the steps of receiving a series of signals constituted by the control signal transmitted through the control channel and the data signal transmitted through the conversation channel from a user using a plurality of antennas, calculating a weight vector of the control signal received through the control channel, storing the calculated weight vector of the control signal, calculating a weight vector of the data signal received through the conversation channel with the stored weight vector as an initial value, and extracting the data signal according to the calculated weight vector of the data signal.

According to still another aspect of the present invention, a weight vector calculation method in a radio communication system that transmits a data signal formed of signal portions with different contents through a conversation channel within one time slot, includes the steps of receiving the data signal transmitted through the conversation channel from a user using a plurality of antennas, and calculating a weight vector using algorithms different between the signal portions having different contents.

The main advantage of the present invention is that the time required for the convergence of weight vector calculation can be reduced by calculating beforehand a weight vector in a control channel and using the vector value thereof as an initial value in calculating a weight vector in a conversation channel.

Another advantage of the present invention is that communication quality is improved with an appropriate amount of calculation by switching the algorithm to calculate a weight vector between the preamble and the data forming a data signal in the conversation channel.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
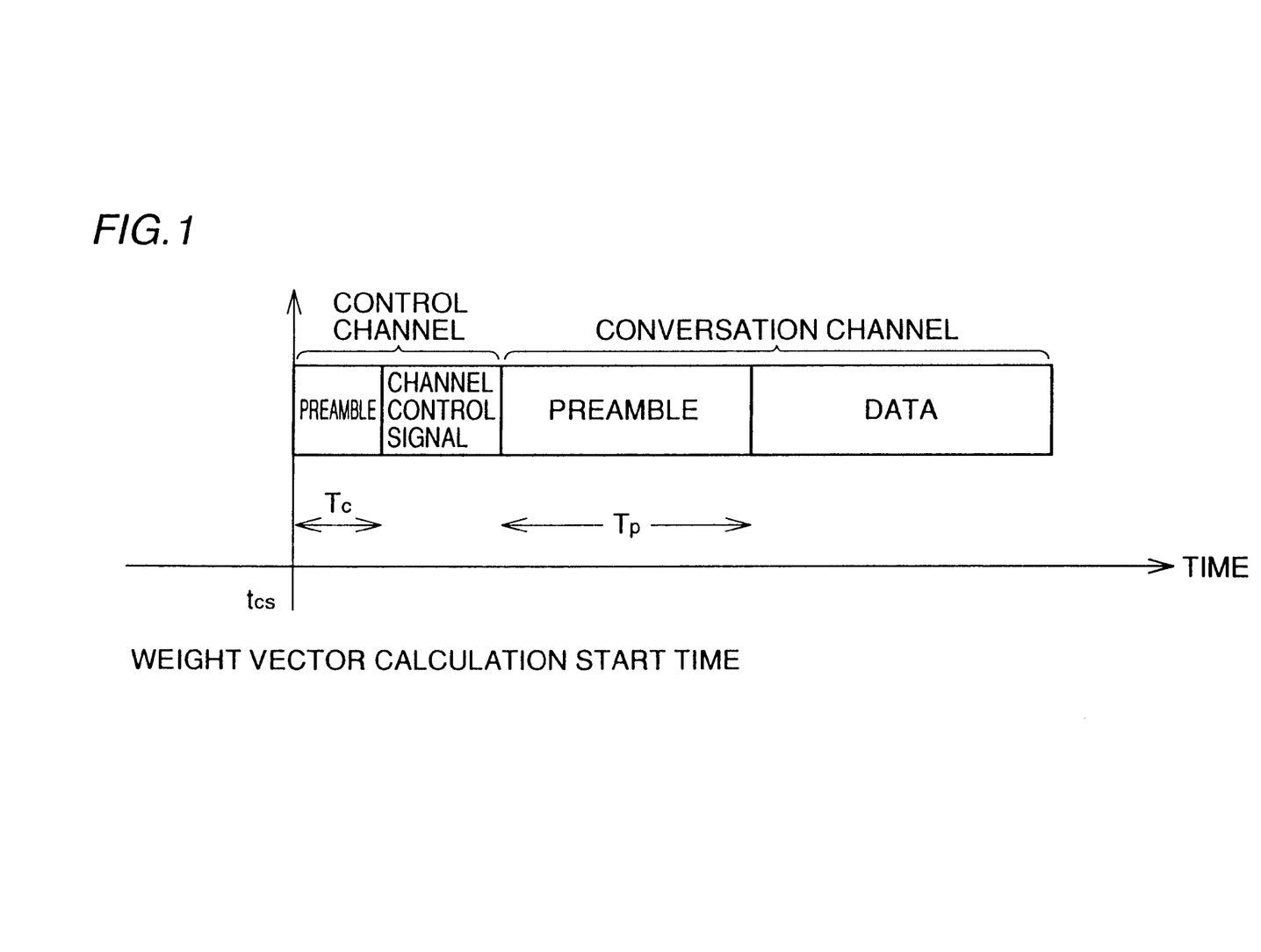
FIG. 1 shows the start time point of calculating a weight vector according to an embodiment of the present invention.
Figure 2:
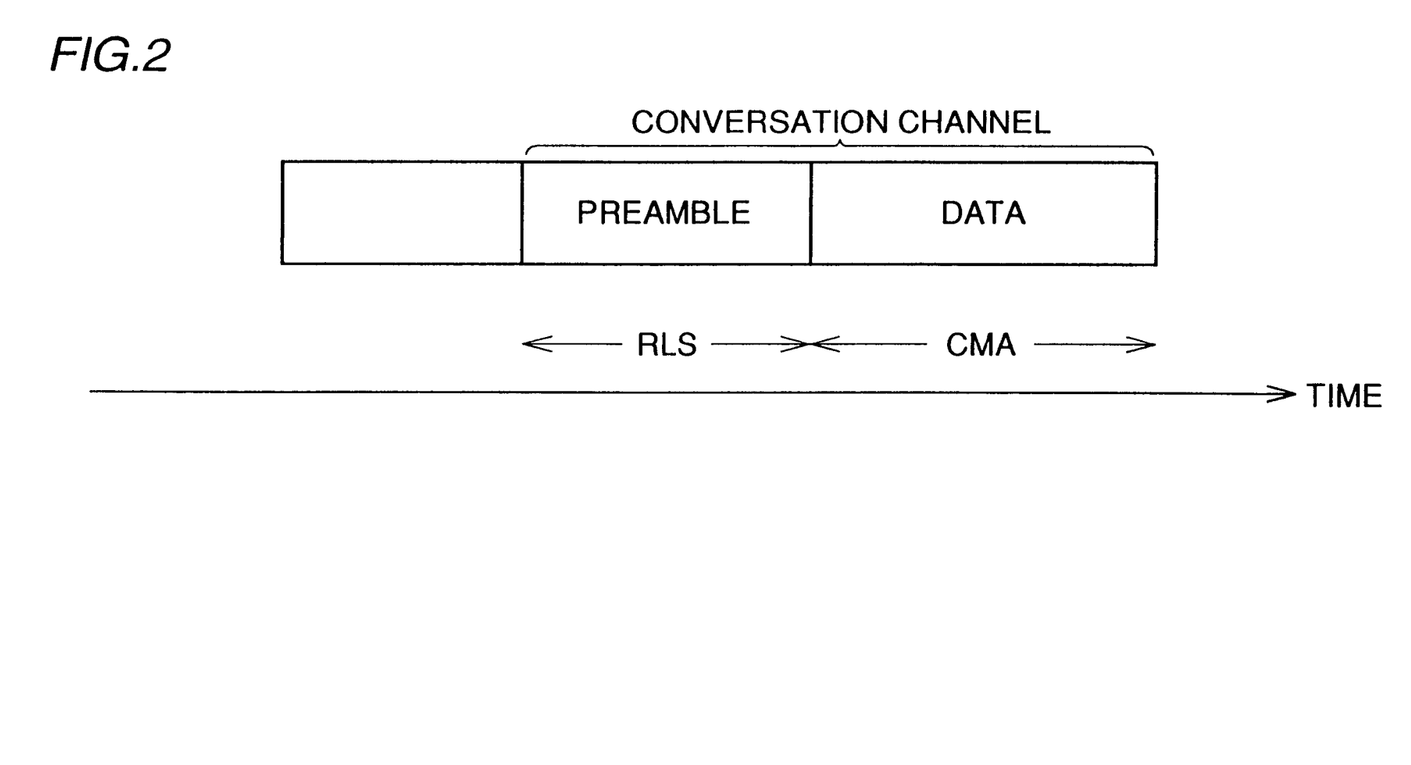
FIG. 2 is a schematic diagram for describing a calculation method of a weight vector according to another embodiment of the present invention.

FIG. 1 is a diagram to describe the start time point of calculating a weight vector according to a first embodiment of the present invention. FIG. 2 is a diagram to describe the weight vector calculation method.

In contrast to the conventional structure of FIG. 9 in which calculation of a weight vector is to be converged within a time $T_p$ of a preamble from an extraction request of a conversation channel, the first embodiment of FIG. 1 has a structure in which the weight vector calculation is to be converged within a total time of a time $T_c$ of the preamble of a control channel and a time $T_p$ of the preamble of a conversation channel from the extraction request of a channel control signal of the control channel.

Furthermore, in contrast to the conventional case of FIG. 10 where the weight vector is calculated by an algorithm identical to both the preamble and the data of the conversation channel, the embodiment of FIG. 2 calculates the weight vector by different algorithms for the preamble and the data to reduce the average error rate of data than in the conventional case.

Figure 3:
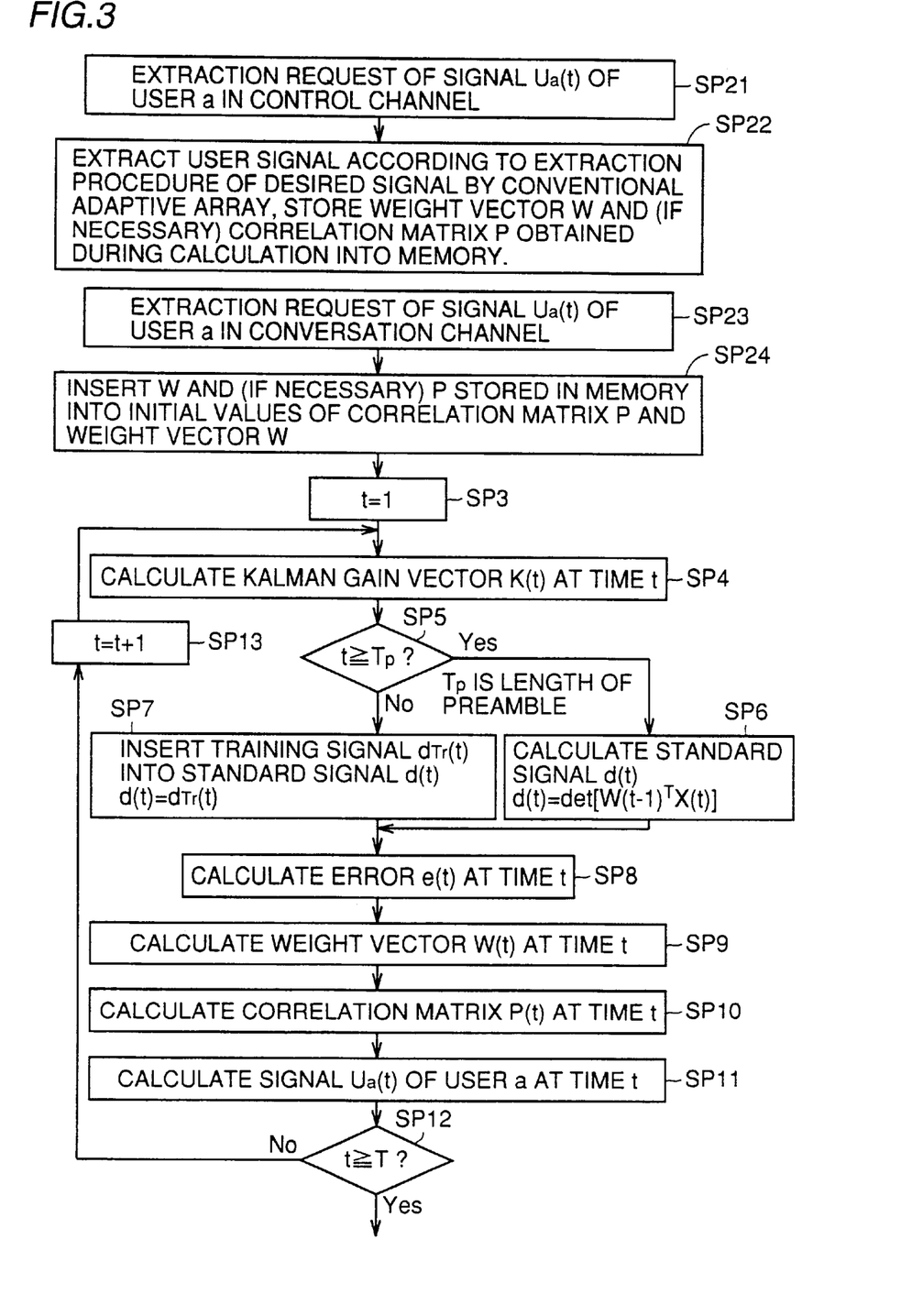
FIG. 3 is a flow chart for describing an operation of the first embodiment of FIG. 1.

FIG. 3 is a flow chart to describe an operation of the first embodiment of FIG. 1. At step SP21, extraction of a signal Ua (t) of user a in the control channel is requested. At step SP22, a user signal is extracted according to the extraction procedure of a desired signal by a conventional adaptive array. A weight vector W of a preamble of the control channel obtained during the calculation and, if necessary, a correlation matrix P, are stored in the memory.

Accordingly, the process at the control channel ends. Then, the process at the conversation channel is carried out. More specifically, extraction of a signal Ua (t) of user a in the conversation channel is requested at step SP23. At step SP24, weight vector W and, if necessary, correlation matrix P stored in the memory at step SP22 are substituted for the initial values of weight vector W and correlation matrix P. Then, the process of steps SP3–SP13 described with reference to FIG. 1 is executed.

Figure 4:
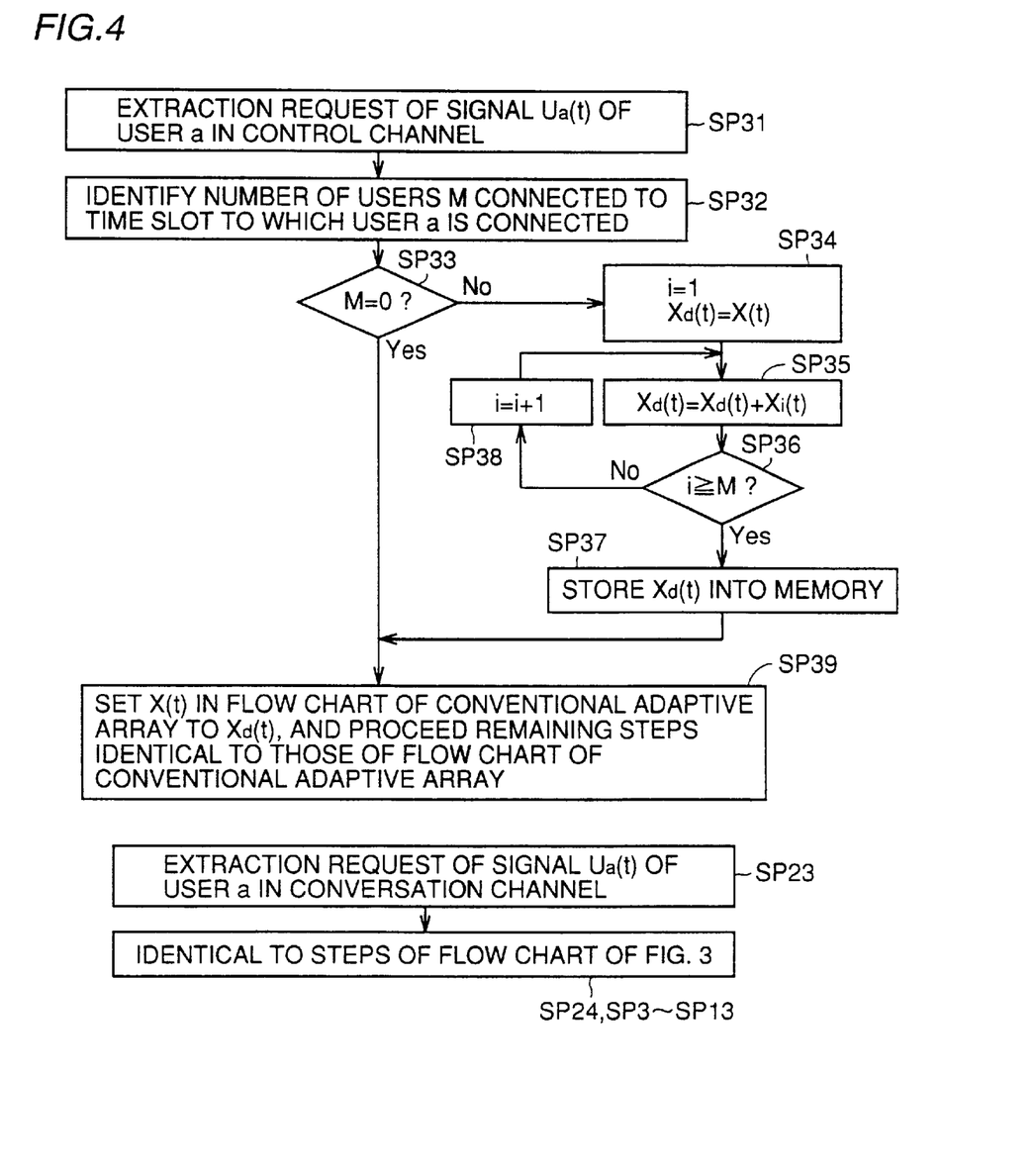
FIG. 4 is a flow chart for describing an operation of a second embodiment of the present invention.

FIG. 4 is a flow chart for describing an operation of the second embodiment of the present invention. In the second embodiment, the vector of a reception signal of a user that is currently conversing is mixed at the same time slot of the same frequency during the procedure of the weight vector calculation in the control channel to produce a reception status of the conversation channel in a pseudo manner in the control channel, whereby an initial value of higher precision of the weight vector can be obtained.

More specifically, at step SP31, extraction of signal Ua (t) of user a in the control channel is requested. At step SP32, the number of users M already connected to the time slot of the same frequency to which user a in to be connected is identified. At step SP33, determination is made whether the number of users M is 0 or not. When M is not 0, control proceeds to step SP34 to set i=1. The dummy reception signal vector Xd (t) at time t is set as the reception signal vector of the control channel at time t.

At step SP35, the reception signal vector Xi (t) of the i-th user that is currently in conversation at time t is added to the dummy reception signal vector Xd (t) of time t. The result is set as the dummy reception signal vector Xd (t).

At step SP36, determination is made whether i is at least M. When i≧M is not established, control proceeds to step SP38 to increment i by+1. Then, the process of steps SP35 and SP36 is repeated. When determination is made that i≧M at step SP36, control proceeds to step SP37 to store Xd (t) into the memory. At step SP39, the operation of steps SP2 and et seq of FIG. 11 is executed, provided that reception signal vector X (t) of FIG. 1 is substituted by dummy reception signal vector Xd (t).

As to the conversation channel, the process of steps SP23, SP24 and SP3–SP13 of FIG. 3 is carried out.

Figure 5:
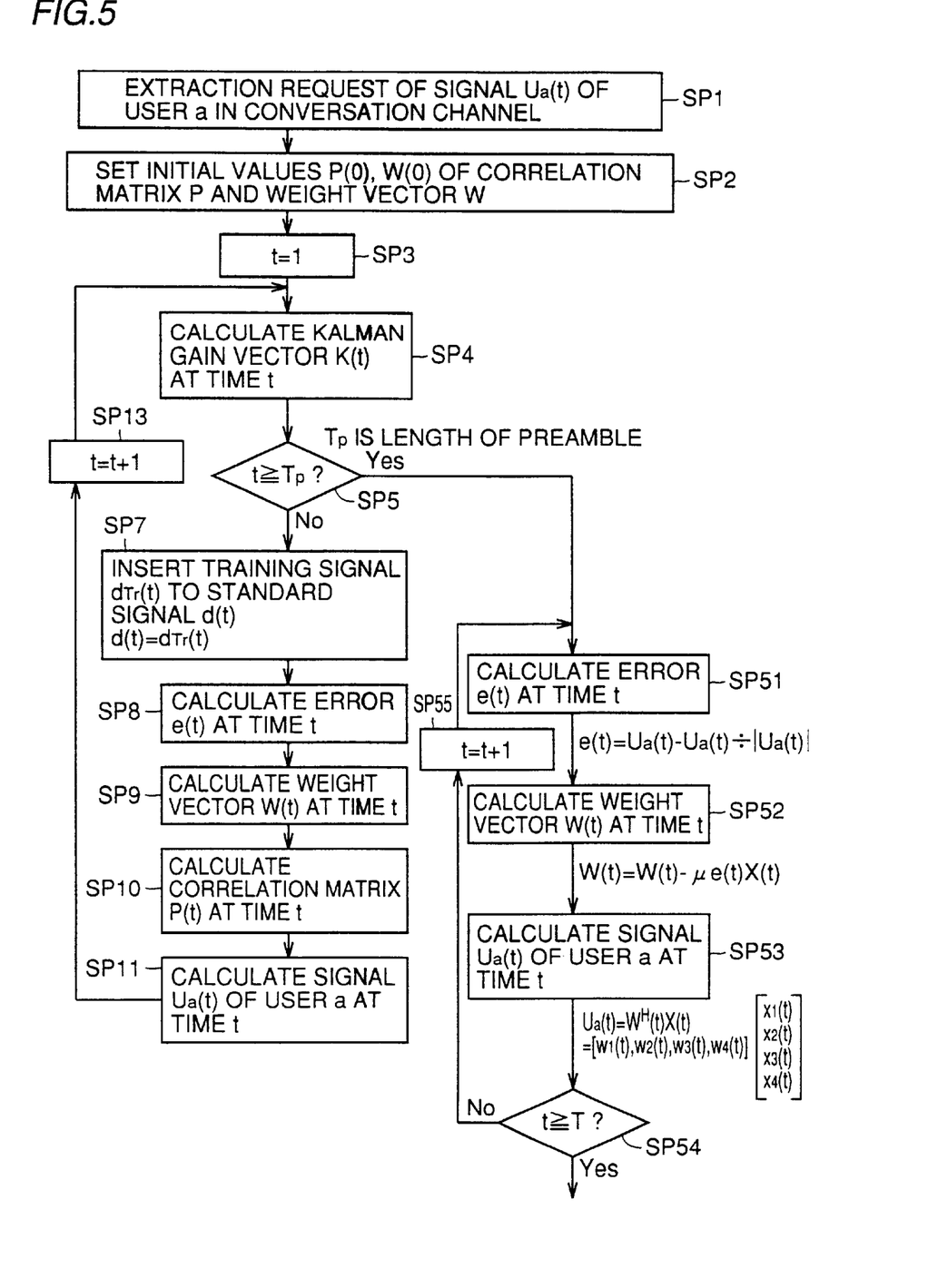
FIG. 5 is a flow chart for describing an operation of a third embodiment of the present invention corresponding to FIG. 2.

FIG. 5 is a flow chart of the third embodiment of the present invention to realize the operation principle of the present invention of FIG. 2.

When the series of signals transmitted through the conversation channel is a known preamble as shown in FIG. 2, the weight vector is converged fast enough despite the great amount of calculation by using the RLS algorithm that allows the weight vector calculation to converge speedily. When the series of signals transmitted through the conversation channel is formed of unknown voice and data, a weight vector can be calculated with a small amount of signal processing by using the weight vector converged sufficiently at the above preamble as the initial weight vector in the execution of the CMA algorithm. To this end, the procedure shown in the flow chart of FIG. 5 uses the RLS algorithm described in the conventional case of FIG. 1 for steps SP1–SP11 and SP13, and uses the CMM algorithm for steps SP51–SP55. When time to t becomes longer than the time length $T_p$ of the preamble at SP5, determination is made that the preamble is unknown data. At step SP51, error e (t) at time t is calculated according to the following equation.

$$e(t) = Ua(t) - Ua(t) \div |Ua(t)|$$

At step SP52, weight vector W (t) at time t is calculated according to the following equation.

$$W(t) = W(t) - \mu e(t)(t)X(t)$$

At step SP53, signal Ua (t) of user a at time t is calculated according to the following equation.

$$Ua(t) = W^H(t)X(t)$$
$$= [W_1(t), W_2(t), W_3(t), W_4(t)] \begin{bmatrix} X_1(t) \\ X_2(t) \\ X_3(t) \\ X_4(t) \end{bmatrix}$$

At step SP54, determination is made whether time T of one time slot is shorter than t. When T is not shorter than t, control proceeds to step SP55 to increment t by+1. Then, control returns to step SP51 to repeat the process of steps SP51–SP54.

According to the above third embodiment, the amount of calculation can be reduced while maintaining sufficient communication quality in comparison to the conventional case where the weight vector is calculated using only the RLS algorithm. Furthermore, although the amount of calculation may be slightly increased than the case where only CMA algorithm is used, the communication quality can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A radio communication system transmitting a control signal to initiate conversation through a control channel, and transmitting a data signal for conversation through a subsequent conversation channel having a frequency differing from the frequency of said control channel, comprising:

reception means including a plurality of antennas for receiving a series of signals constituted by said control signal transmitted through said control channel and said data signal transmitted through said conversation channel from a user, first calculation means for calculating a weight vector of said control signal received through said control channel, memory means for storing said calculated weight vector of said control signal, second calculation means for calculating a weight vector of said data signal received through said conversation channel with the weight vector stored in said memory means as an initial value, and signal extraction means for extracting said data signal according to said calculated weight vector of said data signal.

2. The radio communication system according to claim 1, wherein said first calculation means comprises means for calculating a reception signal vector of another user already in conversation using a time slot and a frequency identical to the time slot and the frequency desired by a relevant user, means for producing in a pseudo manner a reception status of a signal in said conversation channel according to said calculated reception signal vector, and means for calculating said weight vector of said control signal serving as said initial value under said reception status produced in a pseudo manner in said control channel.

3. The radio communication system according to claim 1, wherein said data signal is formed of a preamble and data, and said second calculation means calculates a weight vector using algorithms different between said preamble and said data.

4. A reception system of a PDMA radio base station receiving from each user a series of signals constituted by a control signal for initiating conversation transmitted through a control channel and a data signal for conversation transmitted through a subsequent conversation channel having a frequency differing from the frequency of said control channel, comprising:

a plurality of antennas receiving said series of signals from said each user, and an adaptive array separating a series of signals of a desired user from signals received on said antennas, said adaptive array including first calculation means for calculating a weight vector of said control signal received through said control channel, memory means for storing said calculated weight vector of said control signal, second calculation means for calculating a weight vector of said data signal received through said conversation channel with the weight vector stored in said memory means as an initial value, and signal extraction means for extracting said data signal according to said calculated weight vector of said data signal.

5. The reception system according to claim 4, wherein said first calculation means comprises means for calculating a reception signal vector of another user already in conversation using a time slot and a frequency identical to the time slot and the frequency desired by a relevant user, means for producing in a pseudo manner a reception status of a signal in said conversation channel according to said calculated reception signal vector, and means for calculating said weight vector of said control signal serving as said initial value under said reception status produced in a pseudo manner in said control channel.

6. The reception system according to claim 4, wherein said data signal is formed of a preamble and data, and said second calculation means calculates a weight vector using algorithms different between said preamble and said data.

7. A weight vector calculation method in a radio communication system that transmits a control signal to initiate conversation through a control channel and that transmits a data signal for conversation through a subsequent conversation channel having a frequency differing from the frequency of said control channel, comprising the steps of:

receiving a series of signals constituted by said control signal transmitted through said control channel and said data signal transmitted through said conversation channel from a user using a plurality of antennas, calculating a weight vector of said control signal received through said control channel, storing said calculated weight vector of said control signal, calculating a weight vector of said data signal received through said conversation channel with said stored weight vector as an initial value, and extracting said data signal according to said calculated weight vector of said data signal.

8. The weight vector calculation method according to claim 7, wherein said step of calculating a weight vector of said control signal received through said control channel comprises the steps of:

calculating a reception signal vector of another user already in conversation using a time slot and a frequency identical to the time slot and the frequency desired by that user, producing a reception status of a signal in said conversation channel in a pseudo manner according to said calculated reception signal vector, and calculating a weight vector of said control signal serving as said initial value under said reception status produced in a pseudo manner in said control channel.

9. The weight vector calculation method according to claim 7, wherein said data signal is formed of a preamble and data, wherein said step of calculating a weight vector of said data signal received through said conversation channel comprises the steps of calculating a weight vector using algorithms different between said preamble and said data.

10. A weight vector calculation method in a radio communication system transmitting a data signal formed of signal portions of different contents through a conversation channel within one time slot, comprising the steps of:

receiving said data signal transmitted through said conversation channel from a user using a plurality of antennas, and calculating a weight vector using algorithms different between said signal portions of different contents.

* * * * *